United States Patent
Tilli et al.

[11] Patent Number: 5,907,885
[45] Date of Patent: Jun. 1, 1999

[54] MULTI-FUNCTIONAL APPARATUS FOR USE IN AN AUTOMOTIVE VEHICLE EMPLOYING MULTIPLE TRACKS

[75] Inventors: Christopher R. Tilli, Westland; Harry F. Dutka, Taylor, both of Mich.

[73] Assignee: UT Automotive Dearborn, Inc., Dearborn, Mich.

[21] Appl. No.: 08/948,165

[22] Filed: Oct. 9, 1997

[51] Int. Cl.⁶ .................. B60S 1/18; B60S 1/22; B60S 1/06
[52] U.S. Cl. .................. 15/250.16; 15/250.15; 15/250.3; 15/250.31; 74/89.14; 74/426; 70/237; 70/442; 70/444; 49/280
[58] Field of Search .................. 15/250.3, 250.31, 15/250.16, 250.17; 74/89.14, 426; 70/237, 442, 444; 49/280, 281

[56] References Cited

U.S. PATENT DOCUMENTS

| | | |
|---|---|---|
| 2,271,207 | 1/1942 | Rhein . |
| 2,615,945 | 10/1952 | Jaeschke . |
| 2,659,237 | 11/1953 | Wood . |
| 2,722,617 | 11/1955 | Cluwen et al. . |
| 2,959,803 | 11/1960 | Ziegler . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 28 16 207 A1 | 10/1979 | Germany . |
| 3711933A1 | 10/1988 | Germany . |
| 3807087 A1 | 9/1989 | Germany . |
| 39 23 688 A1 | 1/1991 | Germany . |
| 43 13 363 A1 | 11/1993 | Germany . |
| 4326058A1 | 2/1994 | Germany . |
| 43 37 760 A1 | 5/1994 | Germany . |
| 19645611A1 | 5/1998 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

(List continued on next page.)

*Primary Examiner*—Gary K. Graham
*Assistant Examiner*—Jennifer C. McNeil
*Attorney, Agent, or Firm*—Harness, Dickey & Pierce, P.L.C.

[57] ABSTRACT

A multi-functional apparatus for use in an automotive vehicle employing multiple tracks has a housing, a rotatable member located in the housing, an electromagnetic device and multiple tracks. The electromagnetic device may be an electric motor which operates in a unidirectional manner to oscillate a window wiper assembly. The electric motor and rotatable member then reverse rotational direction to move the wiper assembly to a park position, allowing the actuation of an intermittent motion mechanism.

21 Claims, 10 Drawing Sheets

U.S. PATENT DOCUMENTS

| | | |
|---|---|---|
| 3,858,922 | 1/1975 | Yamanaka . |
| 3,917,330 | 11/1975 | Quantz |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,875,053 | 10/1989 | Harada . |
| 4,878,398 | 11/1989 | Heinrich . |
| 4,885,512 | 12/1989 | Gillé et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,119,523 | 6/1992 | Unterborn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,226,200 | 7/1993 | Buchanan, Jr. et al. . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,440,186 | 8/1995 | Forsell et al. . |
| 5,462,337 | 10/1995 | Yamakami . |
| 5,485,044 | 1/1996 | Mackay et al. . |
| 5,519,258 | 5/1996 | Stroven et al. . |
| 5,528,959 | 6/1996 | Yamakami . |
| 5,691,586 | 11/1997 | Yonnet et al. . |
| 5,694,812 | 12/1997 | Maue et al. . |
| 5,730,028 | 3/1998 | Maue et al. |

OTHER PUBLICATIONS

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Exhibit A—(UTA 26 Gate Wiper Motor), prior to Oct. 9, 1997.

Exhibit B—(1996 Ford Windstar Wiper Motor), prior to Oct. 9, 1997.

Exhibit C—(1996 Chevy Blazer Wiper Motor), prior to Oct. 9, 1997.

Exhibit D—(1996 Honda Civic Rear Unidirectional Wiper Motor), prior to Oct. 9, 1997.

Exhibit E—(1996 Toyota Direct Drive Unidirectional Wiper Motor), prior to Oct. 9, 1997.

Exhibit F—(1996 Honda Civic Wiper Motor), prior to Oct. 9, 1997.

Exhibit G—(Wiper Motor), prior to Oct. 9, 1997.

Exhibit H—(Wiper Motor), prior to Oct. 9, 1997.

Patent Abstracts of Japan, vol. 016, 7–438 (M–1309), Sep. 11, 1992 for JP Patent Publication No. 04151351.

p. 100, *Machine Design*, 60 (1988) Oct. 13, No. 24, Cleveland, Ohio, US.

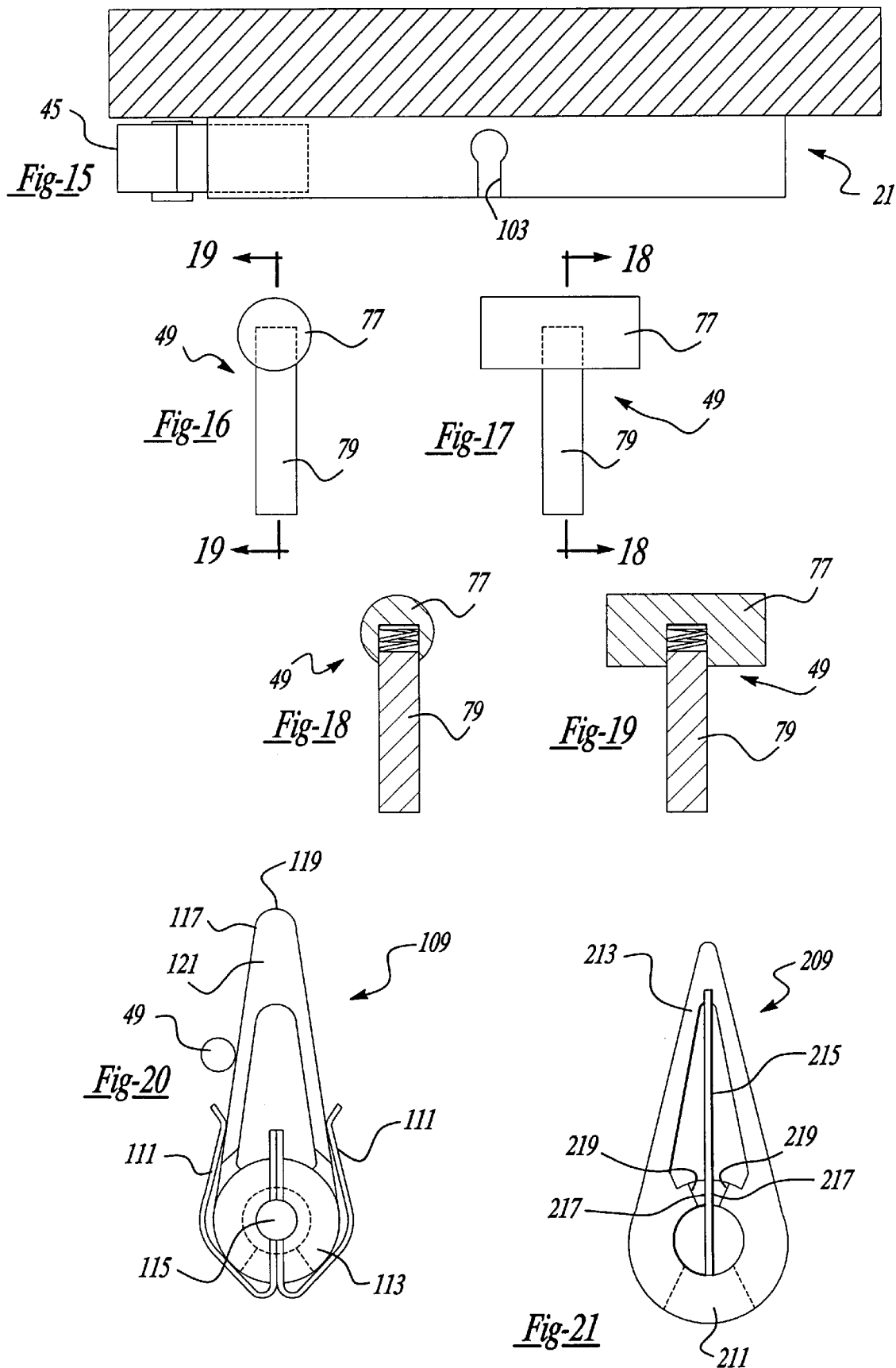

MULTI-FUNCTIONAL APPARATUS FOR USE IN AN AUTOMOTIVE VEHICLE EMPLOYING MULTIPLE TRACKS

BACKGROUND OF THE INVENTION

This invention relates generally to multi-functional apparatuses and more specifically to a multi-functional apparatus for use in an automotive vehicle employing multiple tracks.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. The shafts are either directly driven by electric motors or driven by a single electric motor which actuates a series or a parallel-coupled four bar linkage mechanism.

It is common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, direct current electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. One such example is disclosed in U.S. Pat. No. 5,519,258 entitled "System and Method for Controlling Vehicle Lift Gate Window Wiper" which issued to Stroven et al. on May 21, 1996.

It is also common in the automotive industry to employ windshield and rear window wiper systems that have an electric motor and a worm gear which are constantly reversing directions in order to oscillate a wiper arm and wiper blade back and forth within a wiping range or path on the window. In other words, the electric motor and worm gear rotate in first respective directions for moving the wiper arm and blade to one side of the window and then reverse directions for moving the wiper arm and blade to the other side of the window. In some situations, the electric motor and worm gear are further rotated to move the wiper arm and blade off of the window to a park position.

These constantly reversing electric motors often suffer from objectionable noise and are prone to a shortened duration due to the longitudinal impact of the ends of the armature shaft against the adjacent bearings and end plug members retaining the armature shaft. These conventional devices also cause a high stress enmeshed condition between the worm gear portion of the armature shaft and the driven worm gear teeth thereby causing gear tooth breakage.

Furthermore, it is known to provide a four-bar linkage to couple a worm gear to a window wiper shaft. In this arrangement, an electric motor and worm gear rotate in a unidirectional manner to facilitate back and forth oscillation of a window wiper arm and blade. In this unidirectional, four-bar linkage construction, a pin always moves concurrently with the worm gear, since the pin is always fixed to the worm gear in a single location. The pin is also coupled to the four-bar linkage. This serves to reduce noise and encourage prolonged life of the electric motor and gears, but has proven difficult to provide a wiper arm and wiper blade park position off of the window. Moreover, the four-bar linkage cannot remain stationary if the worm gear is rotated. Such an arrangement is disclosed in U.S. Pat. No. 5,182,957 entitled "Drive Unit, in Particular for a Windshield Wiper System on a Motor Vehicle" which issued to Bohmer et al. on Feb. 2, 1993.

It is also known to provide a window wiper construction having an electric motor and a worm gear with a continuous and closed loop cam track. A pin connected to a drive pawl rides in the cam track. In one position, the pin of the drive pawl is cammed from engagement with a shoulder of the cam track so as to interrupt the driving connection between an output shaft coupled to the wiper and the worm gear. Such an arrangement is disclosed in U.S. Pat. No. 3,688,332 entitled "Mechanism for Opening and Closing a Cover for a Concealed Wiper System" which issued to Bellware on Sep. 5, 1972. Notwithstanding, this device appears to be overly complex. It also requires a large number of parts which adds undue expense. Moreover, disengagement of the drive pawl from the cam track can cause reengagement difficulties due to tolerance mismatches of parts or due to operation of the device on a bumpy road.

Some conventional vehicles also provide a rear window release lock or latch, actuated by a solenoid, which can be unlocked to allow for upward pivotal movement of a rear window in relation to the otherwise stationary liftgate. In combination therewith, a separate liftgate lock is often mounted upon the liftgate door for fastening the liftgate to the body thereby preventing inadvertent pivotal opening. This liftgate lock is traditionally operated by manual key or handle rotation, or through a separate electric motor or solenoid.

Separate motors or solenoids are commonly required to actuate these various locks and the wiper. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electric wiring costs, objectional motor noise, and failure modes are increased.

Furthermore, U.S. Pat. No. 3,688,332 which issued to Bellware, as set forth above, discloses a windshield wiper device that further employed levers and pivot pins to open and close a cover. More recently, WO 96/33891 entitled "Multi-Functional Apparatus Employing an Intermittent Motion Mechanism," WO 96/33893 entitled "Multi-Functional Apparatus Employing an Electromagnetic Device," and WO 96/33892 entitled "Control System for an Automotive Vehicle Multi-Functional Apparatus," all of which were published on Oct. 31, 1996, disclose a significantly improved system wherein a single electromagnetic device can selectively operate intermittent motion mechanisms coupled to a window wiper, a door lock, a window release lock and the like. Notwithstanding, these devices require further refinement and improvement. For example, if the window wiper is frozen onto a window, a door could not be unlocked with the geneva and starwheel mechanism constructions. Moreover, a car wash or bumpy road could cause the window wiper to undesirably and destructively move from its parked position when a wiper clutch is disengaged, for the split-shaft clutch construction. The split-shaft clutch embodiment also requires further improvements and refinements to increase the durability and robustness of design, while further minimizing the weight of the unit.

SUMMARY OF THE INVENTION

In accordance with the present invention, a multi-functional apparatus for use in an automotive vehicle has a housing, a rotatable member located in the housing, an electromagnetic device, and multiple tracks. In another aspect of the present invention, the electromagnetic device is an electric motor which operates in a unidirectional manner to oscillate a window wiper assembly back and forth in a normal window wiping range. The electric motor and rotatable member then reverse rotational direction to move the wiper assembly to a park position offset from the normal window wiping range, allowing the actuation of at least one intermittent motion mechanism for operating a door lock release or to release a window. In a further aspect of the present invention, at least one, and preferably two, intermittent motion mechanisms are pivotably connected to said inner surface of said housing. In still another aspect of the present invention, a window wiper oscillating mechanism and the wiper assembly are deterred from movement when they are disposed in a park position. In a further aspect of the present invention, a generally Q-shaped track is provided on a rotatable member for receiving a first coupling coupled to a window wiper oscillating mechanism. Intersecting inner and outer curved tracks are provided on an inner surface of a housing for receiving a second coupling used for actuating one or more levers in a reversed rotational direction of the rotatable member.

The multi-functional apparatus of the present invention is advantageous over prior constructions in that the window and door of the present invention can be unlocked even if the window wiper is frozen onto the window. It is believed that this construction will also significantly reduce manufacturing costs and part numbers as compared to geneva mechanisms, starwheel mechanisms, gears, clutches and the like. The present invention is more acceptable of part tolerance variations. Furthermore, the apparatus of the present invention serves to deter externally supplied forces, such as a car wash, bumpy road or the like, from moving and possibly damaging the wiper blade or wiper arm when it is in a park position. Hence, a stop associated with the wiper power transmission beneficially maintains the wiper assembly in its park position while allowing a worm gear to further rotate a predetermined amount in order to actuate optional door lock levers or gears other than those associated with the window wiper. The present invention further increases the durability and robustness of the multi-functional unit while minimizing weight and packaging size.

The multi-functional apparatus of the present invention is also advantageous over conventional systems as the present invention combines many different functions into a single apparatus. For example, the present invention multi-functional apparatus replaces the traditional separate rear wiper motor, liftgate lock/unlock motor or actuator, and rear window unlock solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Moreover, the unidirectional nature of the electric motor and worm gear reduce traditional motor and gear noise while increasing part durability. Additional advantages and features of the present invention will become apparent from the following description and appended claims, taken in conjunction with the accompanying drawings.

BRIEF DESCRIPTION OF THE DRAWINGS

FIG. 15 is a side elevational view of the worm gear employed in a preferred embodiment multi-functional apparatus;

FIG. 16 is a side elevational view of an actuator pin employed in the preferred embodiment multi-functional apparatus;

FIG. 17 is a front elevational view of a spring-loaded actuator pin employed in the preferred embodiment multi-functional apparatus;

FIG. 18 is a cross-sectional view taken along the 18‘318 line in FIG. 17 of a spring-loaded actuator pin employed in a preferred embodiment multi-functional apparatus;

FIG. 19 is a cross-sectional view taken along the 19—19 line in FIG. 16 of a spring-loaded actuator pin employed in a preferred embodiment multi-functional apparatus;

FIG. 20 is a rear elevational view showing a first preferred embodiment lever of the preferred embodiment multi-functional apparatus;

FIG. 21 is a rear elevational view showing a second preferred embodiment lever of the preferred embodiment multi-functional apparatus;

DETAILED DESCRIPTION OF THE PREFERRED EMBODIMENT

Figure 1:
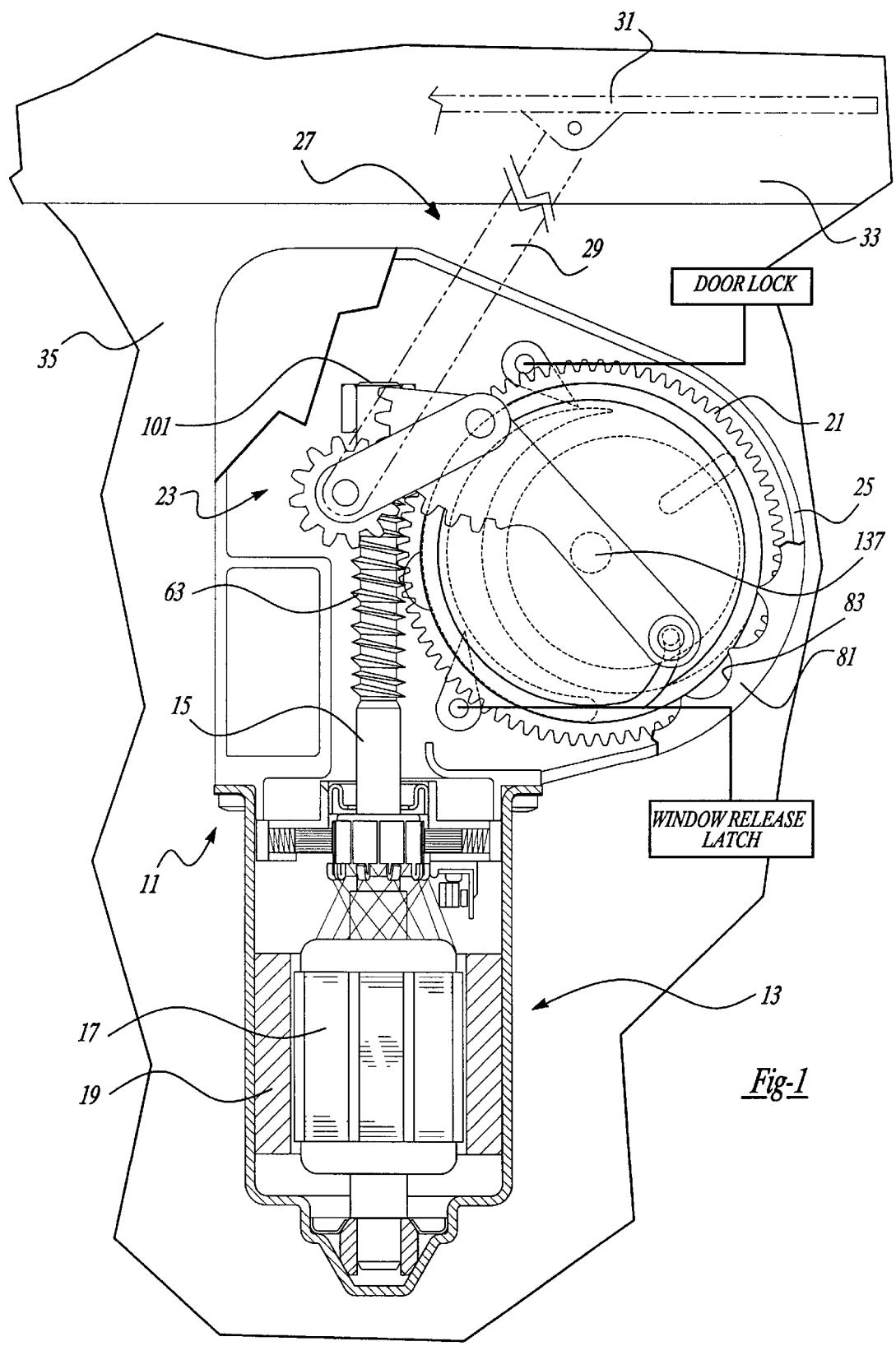
FIG. 1 is a rear elevational view, partially in section, showing the preferred embodiment of a multi-functional apparatus for use in an automotive vehicle of the present invention.

The preferred embodiment of a multi-functional apparatus 11 of the present invention is used in an automotive vehicle, as is shown in FIG. 1. Multi-functional apparatus 11 includes a fractional horsepower, direct current, electric motor 13 having an armature shaft 15, an armature 17 and a fixed, permanent magnet stator 19. Multi-functional apparatus 11 further employs a main or worm gear 21, a window wiper oscillating mechanism, also known as a four-bar linkage mechanism 23, a gear housing 25 and a window wiper assembly 27. Window wiper assembly 27 includes an elongated wiper arm 29 and a wiper blade assembly 31, made up of a claw and a rubber blade, which are wiped in a back and forth, or oscillating manner along a rear liftgate window 33. When a liftgate window release latch is activated, liftgate window 33 is suitable for pivoting relative to a rear liftgate door 35 by way of upper hinges and pneumatic cylinders. Electric motor 13 and gear housing 25 are secured to rear liftgate door 35 as part of a multiplexed rear node arrangement, as is disclosed in U.S. Ser. No. 08/431,149 entitled "Control System For An Automotive Vehicle Multi-functional Apparatus" which was filed on Apr. 28, 1995, and is incorporated by reference herein.

Figure 2:
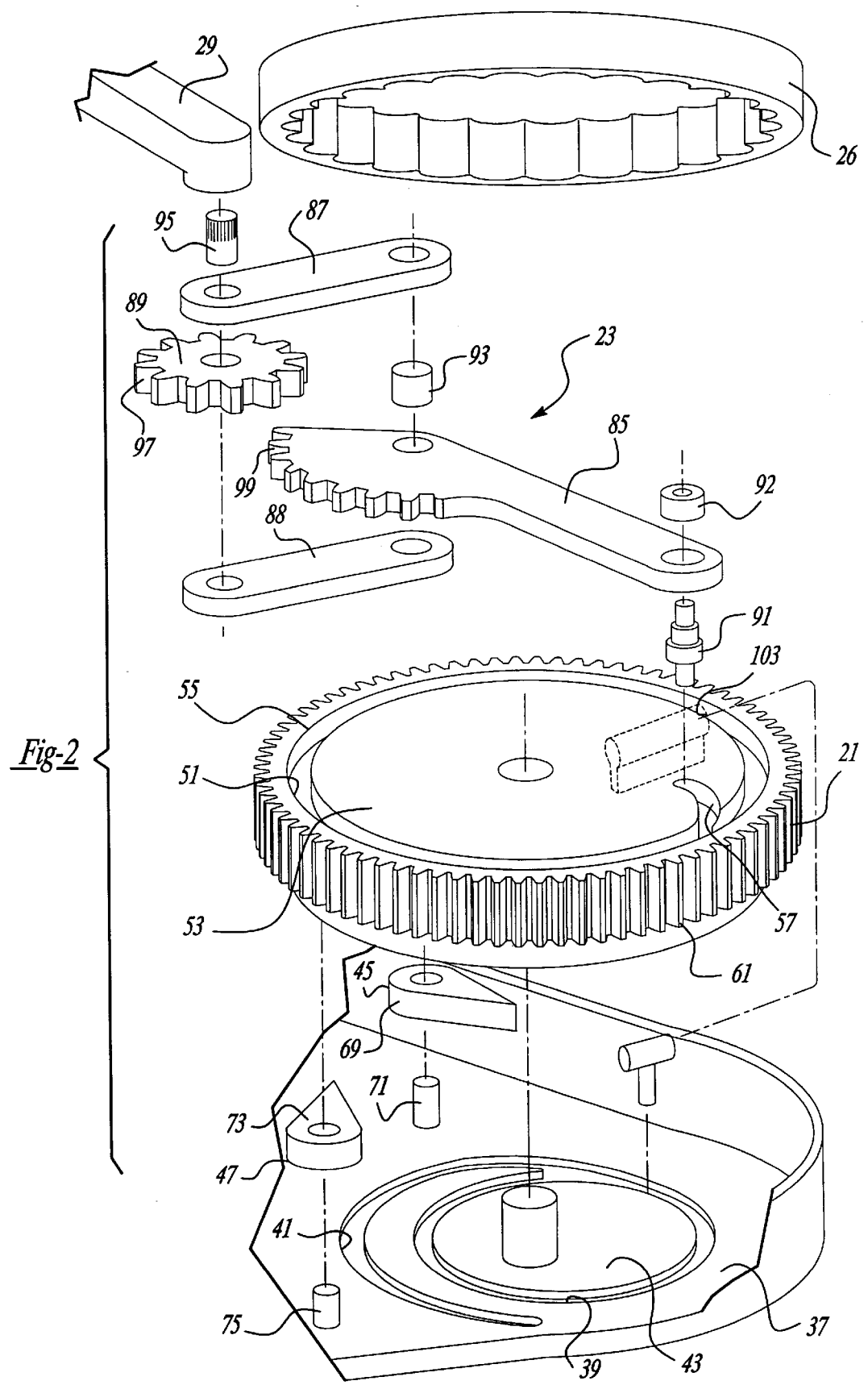
FIG. 2 is an exploded perspective view showing the preferred embodiment multi-functional apparatus.
Figure 3:
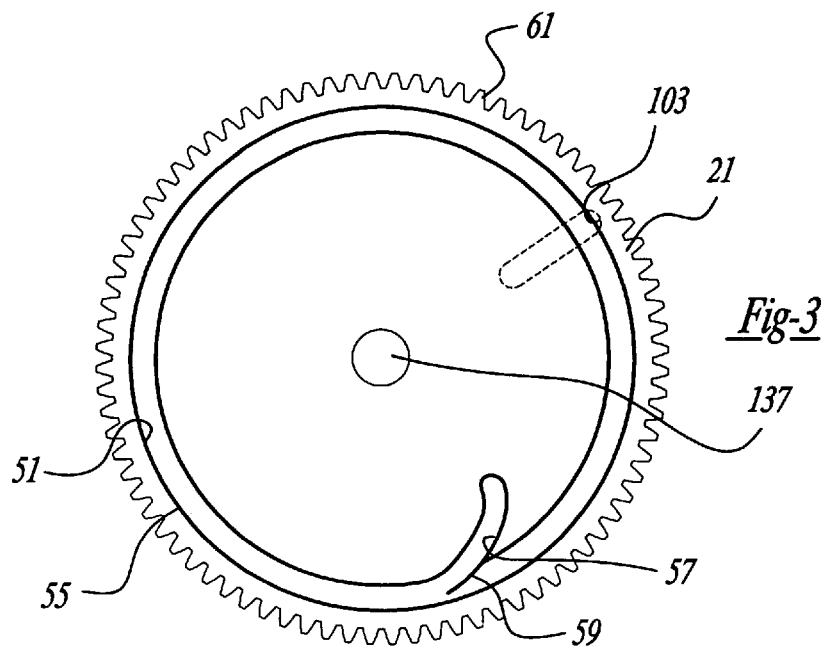
FIG. 3 is a rear elevational view showing a worm gear employed in the preferred embodiment multi-functional apparatus.

Referring to FIGS. 2 and 3, the preferred embodiment of worm gear 21 has generally a Q-shaped track 51 depressed below a nominal face 53. Elongated track 51 has a substantially circular portion 55 and a short, inwardly projecting path 57 disposed along the circular portion. A gate 59, preferably composed of a flexible material such as spring steel or the like, is disposed within track 51 to help guide a cylindrical pin coupling 91 of four-bar mechanism 23 along the track. Pin 91 preferably includes a bearing 92 mounted on top of the pin. The bearing 92 of the pin parks in the multiple stops set forth below. The bearing is preferably composed of polyurethane. A set of externally facing teeth 61 are disposed around a periphery of worm gear 21 and are suitably oriented for enmeshing with a worm gear segment 63 (see FIG. 1) of armature shaft 15 (also see FIG. 1). Worm gear 21 is preferably injection molded from a Delrin® polymeric material.

A stop 81 is illustrated in FIG. 1 as being integrally injection molded with glass-filled nylon or a metal material as part of gear housing 25. Stop 81 is a series of multiple stops that inwardly project from a side wall of housing 25 or may alternately be integrally formed as part of a housing cover 26 secured to gear housing 25 as shown in FIG. 2. A semi-circular receptacle 83 of stop 81 is inwardly facing toward rotational axis 137 of worm gear 21 for selectively receiving a section of four-bar mechanism 23, as will be further discussed hereinafter.

Referring to FIG. 2, four-bar mechanism 23 includes a sector gear 85 (the first theoretical bar), a pair of straight links 87 and 88 (the second and third theoretical bars) and a pinion gear 89 (the fourth theoretical bar). Cylindrical pin coupling 91 depends from an elongated arm extending from sector gear 85. Pin 91 always is engaged with and rides in track 51. Links 87 and 88 are pivotably pinned on either side of sector gear 85 by way of a coupling pin 93. The opposite ends of links 87 are coaxially coupled to a window wiper shaft 95 and sandwich pinion gear 89. Teeth 97 of pinion gear 89 are enmeshed with teeth 99 of sector gear 85. Pinion gear 89 is longitudinally disposed generally between a distal end 101 (see FIG. 1) of armature shaft 15 and armature 17 (also see FIG. 1) in order to optimize packaging and geometry of the mechanism. Furthermore, sector gear 85 does not have a fixed pivot point but instead its rotational center is allowed to freely move or float relative to rotational axis 137 of worm gear 21 and the offset rotational axis of pinion gear 89. Window wiper arm 29 is movably coupled for coincidental movement with wiper shaft 95. Four-bar mechanism 23 is preferably made from steel.

The preferred embodiment of gear housing 25 has an inner surface 37. Inner surface 37 has intersecting inner and outer tracks 39 and 41, respectively, depressed below a nominal face 43. Tracks 39 and 41 have a spiral curved shape. The multi-functional apparatus includes at least one lever-type intermittent motion mechanism 45, and preferably at least a second lever 47, pivotably coupled to inner surface 37 by pivot projections. Other intermittent motion mechanisms may be employed, such as a geneva mechanism, an integrally molded finger, rivet, spring, rib, plural projections or similar formations. First lever 45 is a liftgate door lock and unlock lever coupled to a door lock or latch. Second lever 47 is a window release lever, such as a rear window release lever, to release a window release latch. Lever 45 includes an arm 69 and pin 71, and lever 47 includes an arm 73 and pin 75 to allow the mechanism to pivot when actuated.

Referring now to FIG. 20, levers 45 and 47 preferably have the configuration of lever 109, including circular mounting base 113 and an elongated arm 121. A peripheral engagement or abutting edge surface 117 of arm 121 is angled or tapered from the mounting base 113 toward a distal tip 119. Thus, arm 121 has a generally triangular shape. Mounting base 113 has a central pivot axis mounted for rotation to gear housing (not shown). A lock linkage rod or pin 115 is mounted for rotation to mounting base 113. An actuator or driving pin 49 selectively engages and pushes against edge 117. Lever 109 is preferably made from powdered-metal steel. In a preferred embodiment of a lever of the present invention, a distal end of the lever is bifurcated to receive spring clips 111. When the rotation of a worm gear causes pin 49 to contact surface 117 of lever 109, spring clips 111 flux as the lever is actuated.

A second preferred embodiment of levers 45 and 47 is shown in FIG. 21. In this embodiment, a lever 209 includes a mounting base 211 from which an arm 213 extends. Accordingly, a leaf spring 215 is directly mounted between arm 213 and base 211 and has abutting surfaces 217 which abut against abutting surfaces 219 of mounting base 211.

According to the present invention, a second coupling or pin 49 is always engaged with and rides in intersecting tracks 39 and 41. Referring to FIGS. 2 and 15–19, pin 49 includes a head 77 and arm 79. Pin 49 is a spring-loaded actuator pin composed of steel or a similar material. Worm gear 21 has a path 103 located in an underside portion of the gear perpendicular to the intersecting inner and outer tracks 39 and 41. A distal end of pin 49 rides along the inner and outer tracks and is trapped or secured within path 103 during rotation of worm gear 21. In a preferred embodiment of the present invention (see FIG. 4), the width of tracks 39 and 41 increases at the intersection of the tracks and the radius along the inner track remains the same such that pin 49 is guided by the geometry of the track to enter the outer track when gear 21 is rotating.

Figure 22:
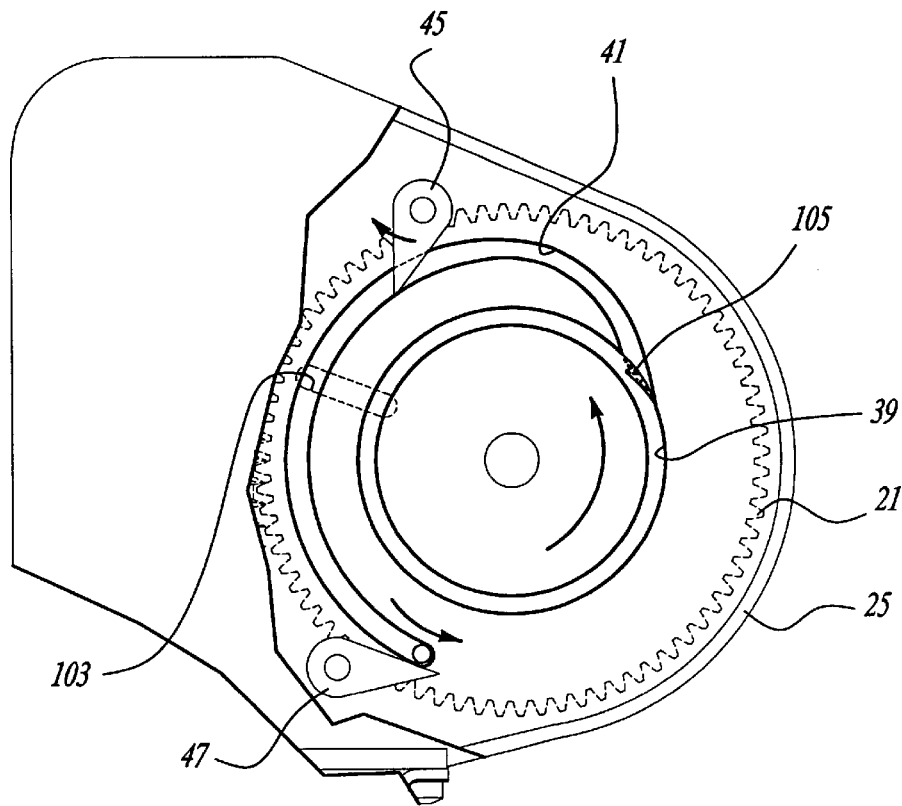
FIG. 22 is a fragmentary rear elevational view showing the bottom portion of the gear housing employing an alternate embodiment of a V-shaped ramp at an intersection of a track in the gear housing for the multi-functional apparatus.
Figure 23:
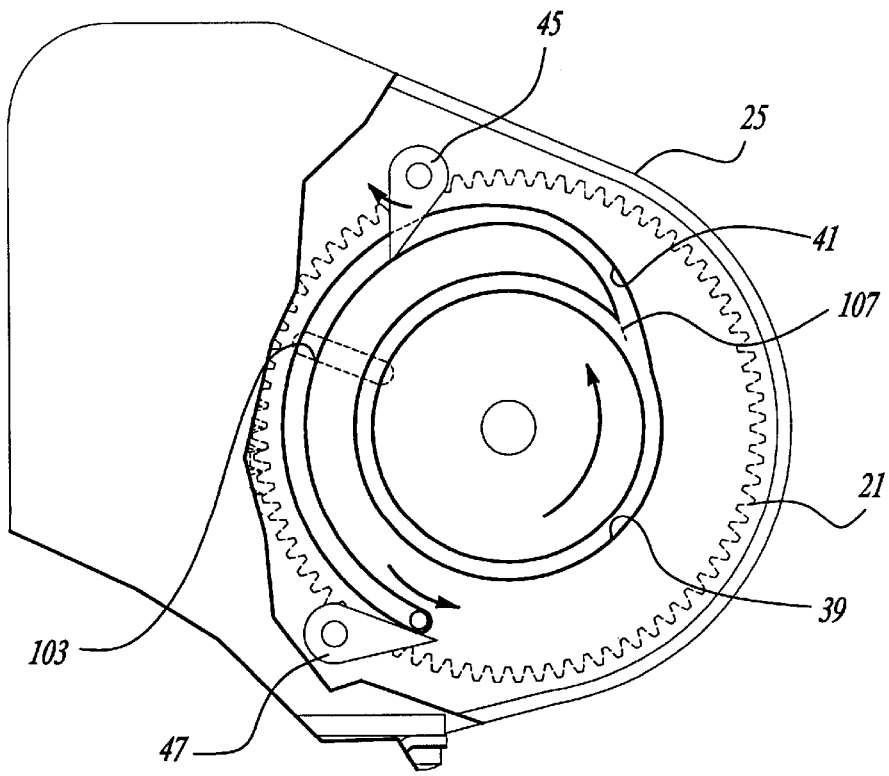
FIG. 23 is a fragmentary rear elevational view showing a bottom portion of a gear housing employing an alternate embodiment gate at an intersection of a track in the gear housing for the multi-functional apparatus.

Alternatively, referring to FIG. 22, the intersection of the inner and outer tracks may include a substantially V-shaped ramp 105 cut or molded into the tracks at their intersection. Ramp 105 helps to guide pin 49 into outer path 41 from inner path 39. In addition, referring to FIG. 23, the present invention may alternatively include a gate 107, composed of a flexible spring steel material, disposed at the intersection of tracks 39 and 41 to help guide pin 49 from the inner track to the outer track when rotation of the worm gear reverses, while still allowing passage of pin 49 during rotation of gear 21 in the opposite direction.

Figure 5:
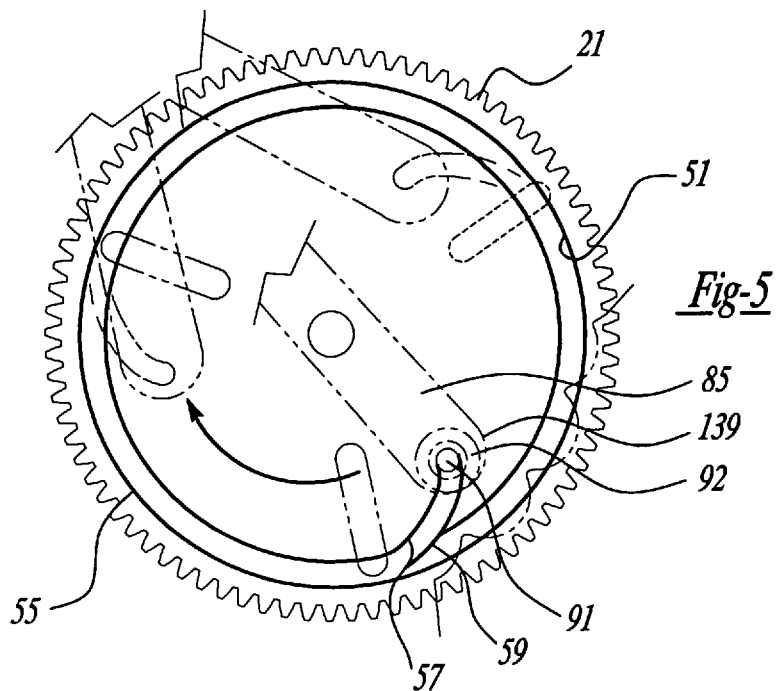
FIGS. 5–14 are front elevational views showing a worm gear employed in the preferred embodiment multi-functional apparatus and corresponding fragmentary front elevational views of the bottom portion of the gear housing, levers and the actuator pin, employed in the preferred embodiment multi-functional apparatus disposed in various positions.

With reference to FIG. 1, the operation of the multifunctional apparatus 11 will now be discussed. Electric motor 13 and worm gear 21 rotate in first respective unidirectional directions in order to drive four-bar mechanism 23 in a forward and reverse direction thereby oscillating window wiper shaft 95 and the attached window wiper arm 29. FIG. 5 shows the rotation of worm gear 21 in the unidirectional direction, for example, clockwise, so as to drive the window wiper oscillating mechanism and pin 91 located in path 57 in the first rotational direction along track 51. This causes sector gear 85, pinion gear 89, window wiper shaft 95 and window wiper arm 29 to rotate in single advancing directions and causes a single sweep of the wiper assembly across the window in the normal window wiping path or range. Further rotation of electric motor 13, worm gear 21 and pin 91 in the first unidirectional direction causes sector gear 85, pinion gear 89, window wiper shaft 95 and window wiper arm 29 to reverse their direction and return wiper assembly 27 back across window 33 to its initial window wiping range orientation.

Figure 4:
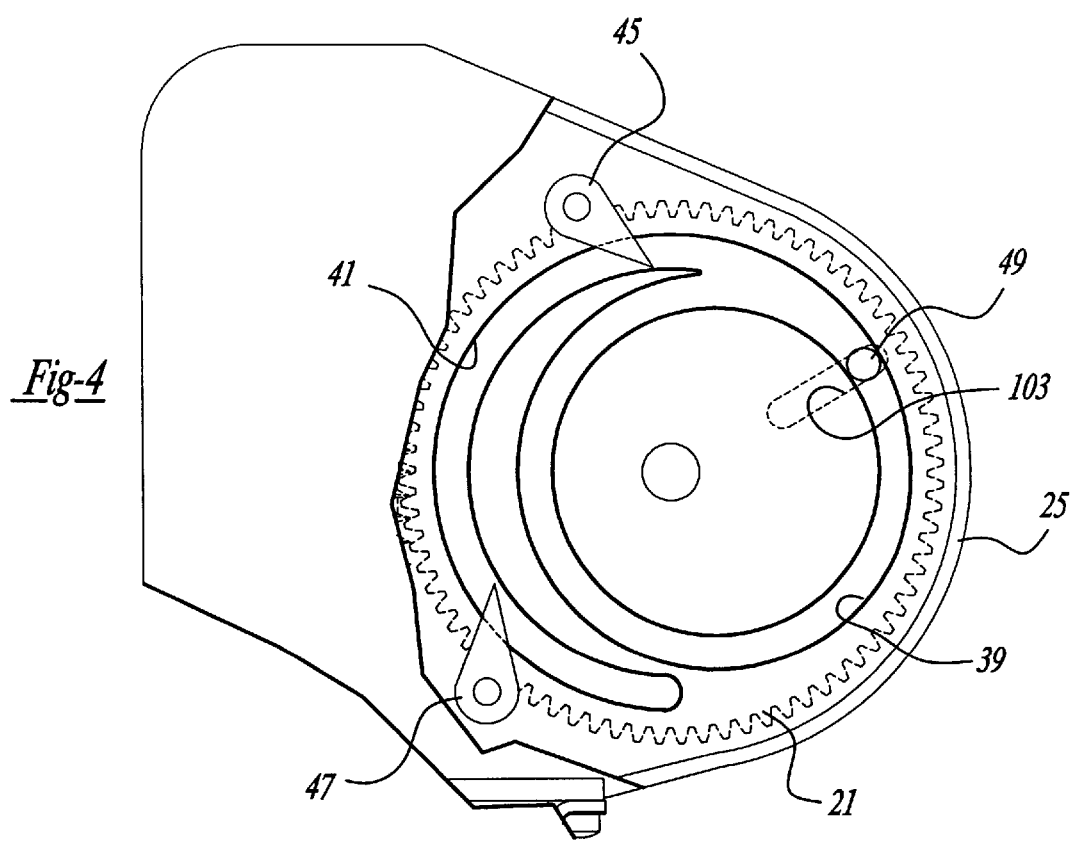
FIG. 4 is a fragmentary rear elevational view of a bottom portion of a gear housing, levers and an actuator pin employed in the preferred embodiment multi-functional apparatus.
Figure 6:
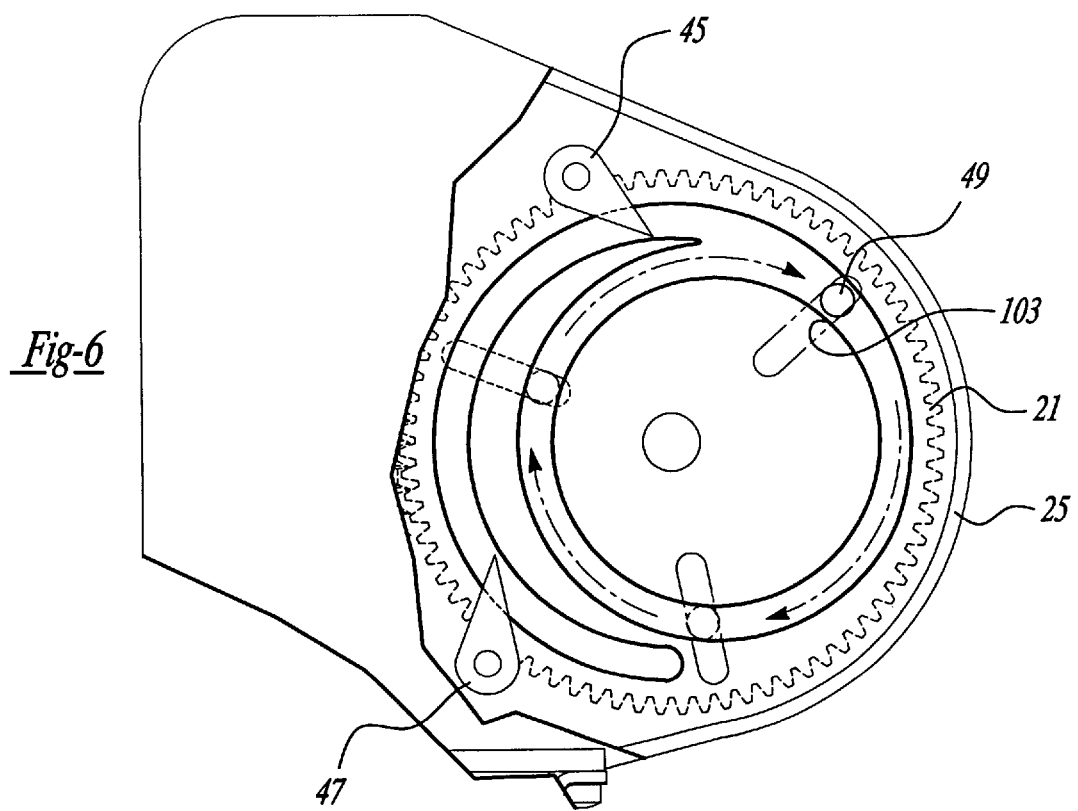

While in wiper mode, arm 79 of pin 49 is simultaneously moved along inner track 39 while head 77 of pin 49 is trapped in path 103 during the same unidirectional movement as the window wiper oscillating mechanism and pin 91, for example, in the clockwise direction (see FIGS. 4 and 6). While riding along inner track 39, pin 49 travels back and forth along path 103 with every rotation of gear 21 due to the eccentric positioning of track 39 relative to the rotational axis of worm gear 21. Pin 49 continues in this direction along inner track 39 during the entire wiping mode of the apparatus in order to avoid interfering with levers 45 and 47 located along outer track 41.

Figure 7:
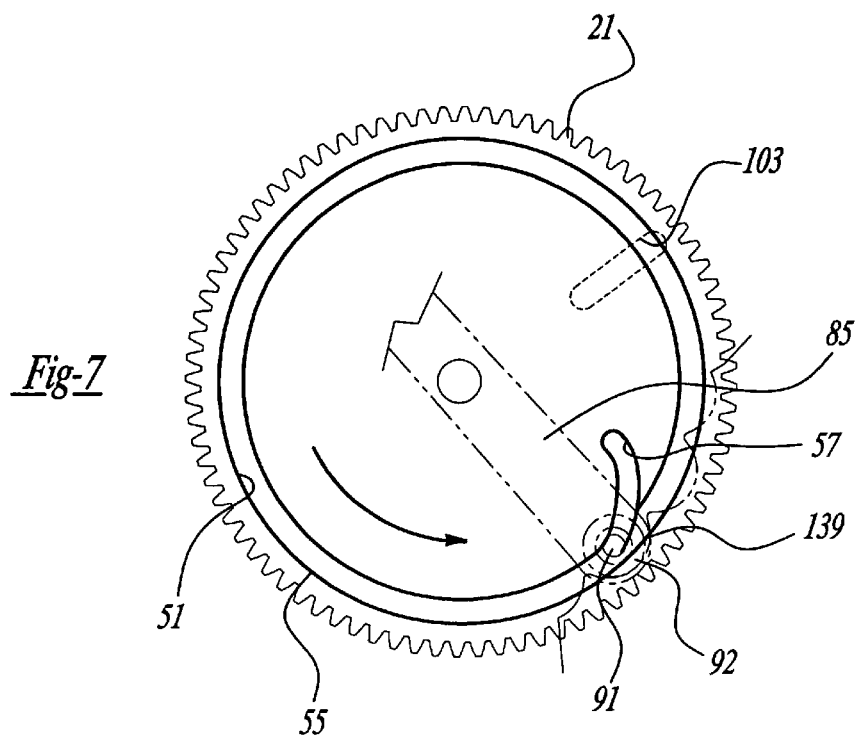

Subsequently, electric motor 13 is energized in a reverse manner thereby reversing the rotational direction of armature shaft 15 and worm gear 21. This reversal direction causes worm gear 21 to rotate independently of four-bar mechanism 23 and window wiper assembly 27 wherein pin 91 freely slides in track 57 from the position shown in FIG. 5 to a park position shown in FIG. 7. Concurrent with this reverse rotation of worm gear 21, track 51 serves to outwardly cam pin 91 away from the rotational axis of worm gear 21 thereby engaging a semi-circular end 139 of sector gear 85, including bearing 92 mounted on top of pin 91, with receptacle 83 of stop 81. This action locks and maintains four-bar mechanism 23 and window wiper assembly 27 in a park position off of the vehicle window 33 to thereby allow window 33 to pivot away from rear door 35.

Figure 8:
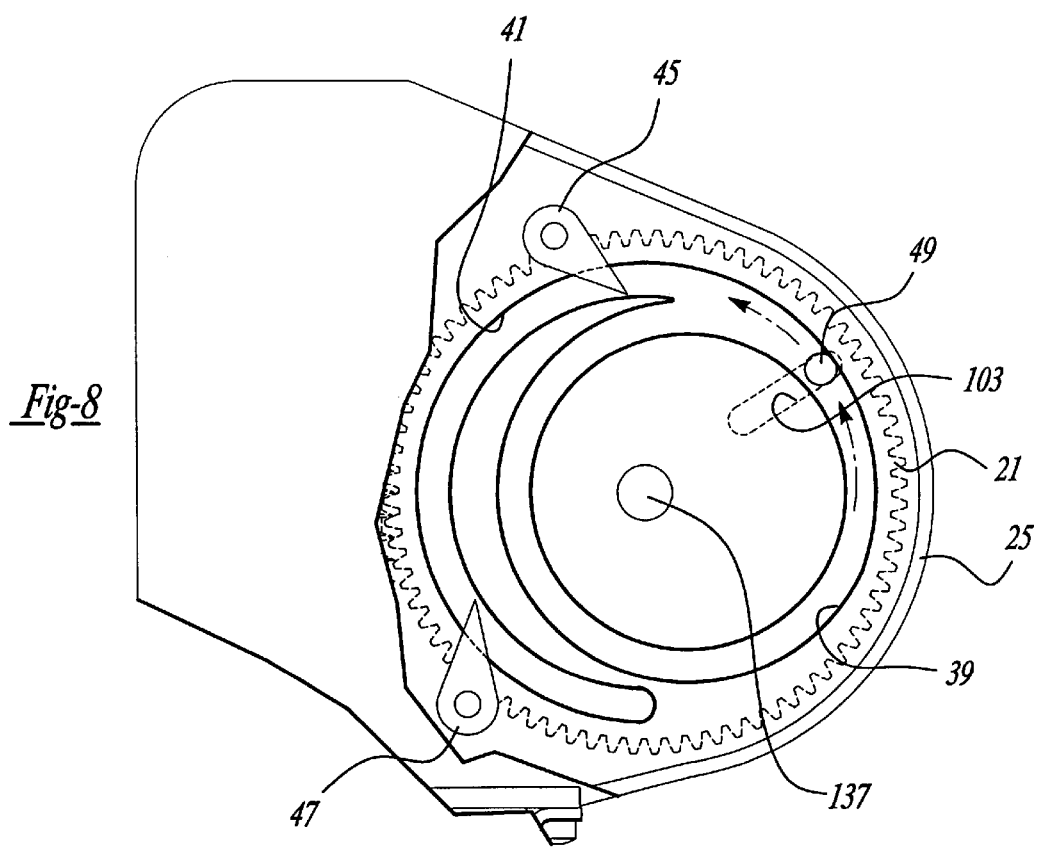

Referring to FIG. 8, pin 49 is guided to outer track 41 while riding within path 103 from inner track 39 to actuate levers 45 and 47 along the outer track. Track 51 of the worm gear most preferably covers a 360 degree rotation to allow clearance for the worm gear to bypass pin 91 when it is in a parked position. In a first preferred embodiment, pin 49 is riding along inner track 39 at a distance radially farthest from a rotational centerline or axis 137 of the worm gear 21, and is subsequently guided to the outer track 41 when the worm gear reverses direction, such as counterclockwise. The width of the intersection of tracks 39 and 41 is increased to further assist in guiding the pin to the outer track.

Alternatively, referring to FIG. 22, the present invention may include a substantially V-shaped ramp 105 formed in the trough of the intersection of the two tracks. One side of the ramp or a slope assists in guiding the pin in the desired direction. In this alternate embodiment, the pin is preferably a spring-loaded pin, and the ramp leading to the outer track 41 is deeper than the path leading to inner track 39. When the apparatus is in window wiper mode, pin 49 travels down only a slight slope and then continues in the same rotational direction. When the gear is rotating in the reverse direction, the pin travels down the steeper slope or ramp in track 41 and is forced to continue to ride along the outer track. Furthermore, referring to FIG. 23, the present invention may alternatively include a gate 107 at the intersection of tracks 39 and 41 which blocks the travel of pin 49 to the inner track and subsequently guides the pin to the outer track. Gate 107 is preferably made of a flexible material.

Figure 9:
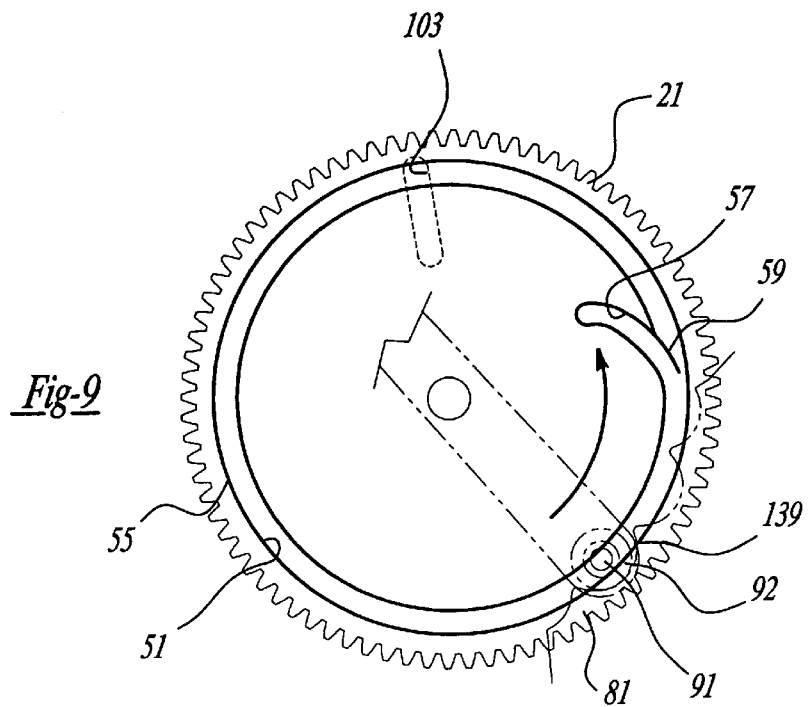
Figure 10:
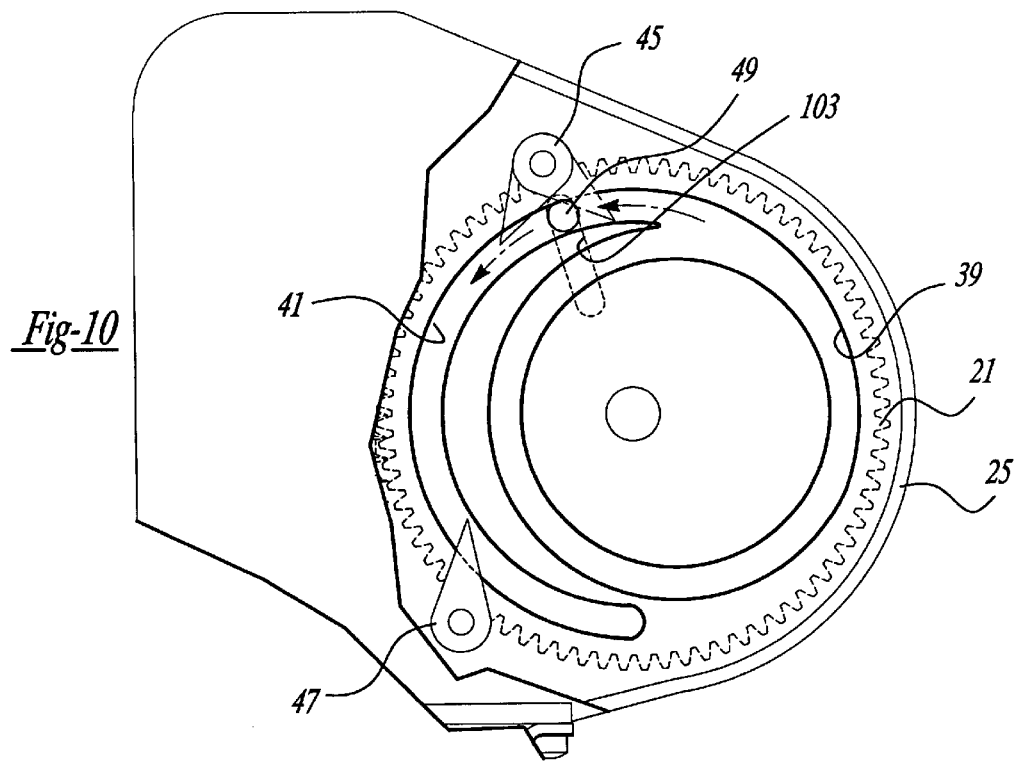

Referring to FIGS. 10 and 20, pin 49 rides along outer track 41 in response to the rotational direction of the worm gear 21 in order to actuate the levers 45 and 47. For purposes of discussion only, levers 45 and 47 are preferably shown in FIG. 20 as lever 109. Pin 49 engages and presses against first lever 109, preferably a liftgate unlock and lock lever. Gear 21 and pin 49 further rotate so as to rotate lever 109 about a pivot axis, thereby locking the lock for the liftgate. FIG. 9 illustrates the corresponding top view of worm gear 21 and the parked position of pin 91 at the moment of rotation shown in FIG. 10.

Arm 121 of lever 109 rotates from a position projecting over outer track 41 to a clearance position off the track as shown in FIG. 10 such that pin 49 can continue in its rotational path 41 without interference of arm 121. However, it is necessary to bias arm 121 back into rotational path of pin 49 in track 41 for re-engagement upon reversal of direction of gear 21. Thus, the liftgate lock may be unlocked when the rotational direction of gear 21 is reversed and the pin is driven back against and actuates the liftgate lever.

Figure 11:
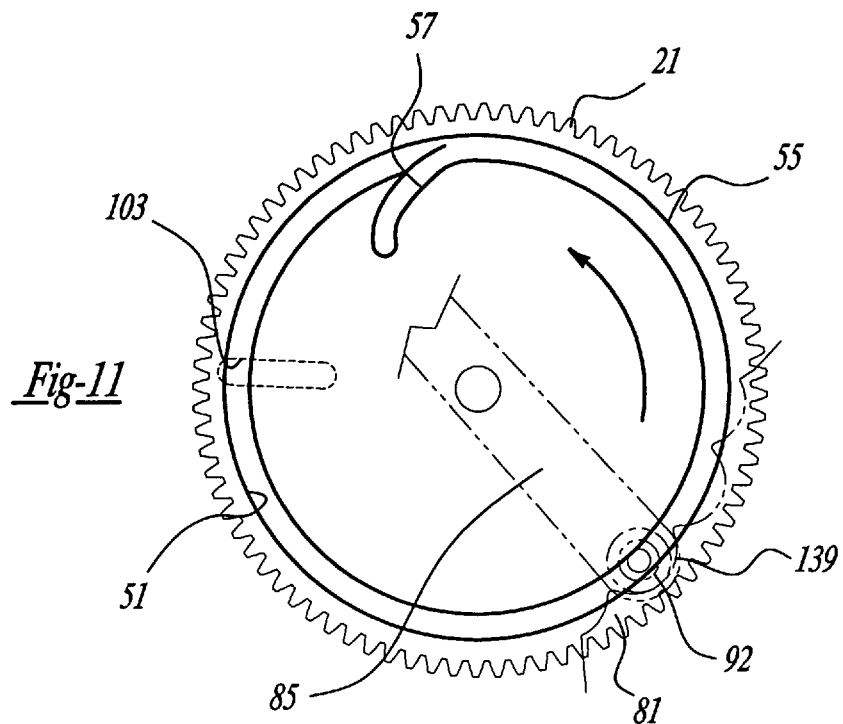
Figure 12:
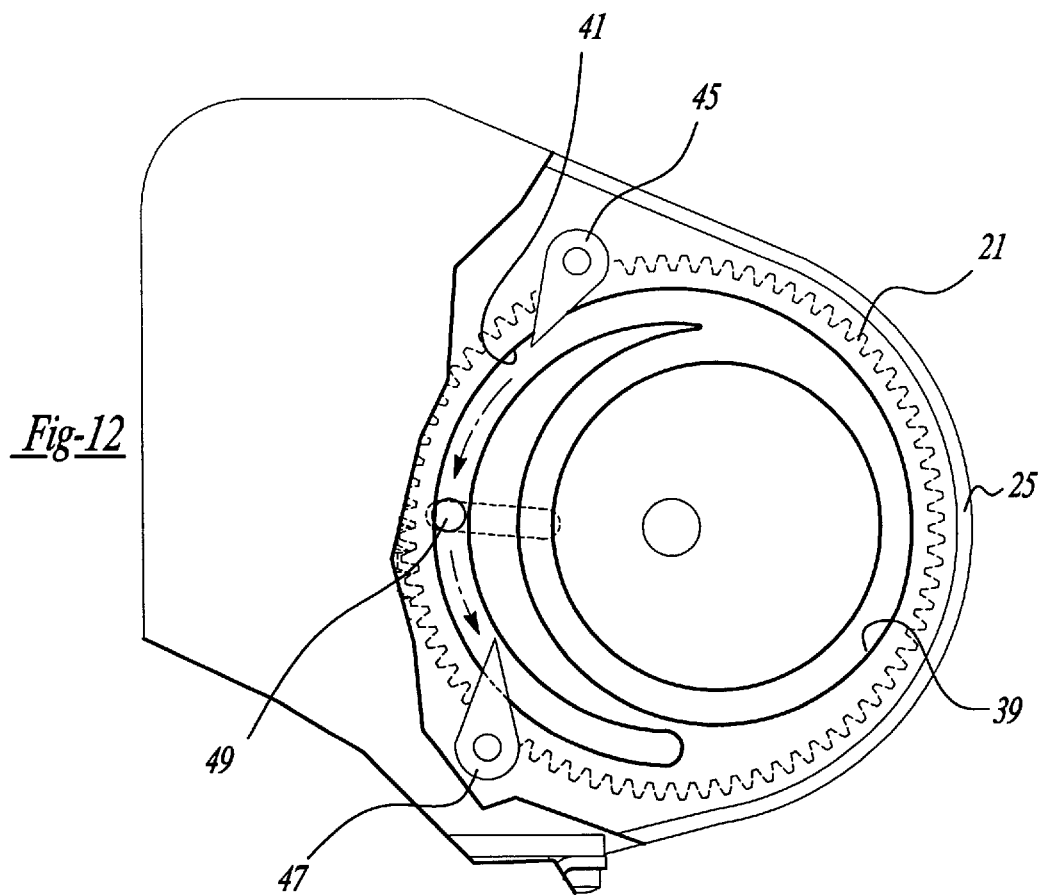
Figure 13:
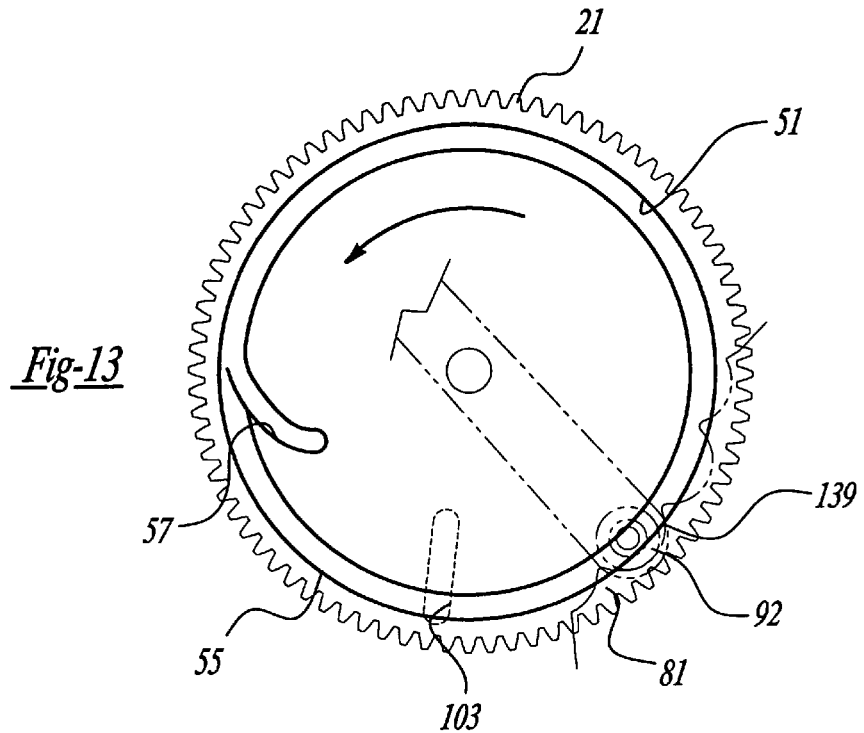
Figure 14:
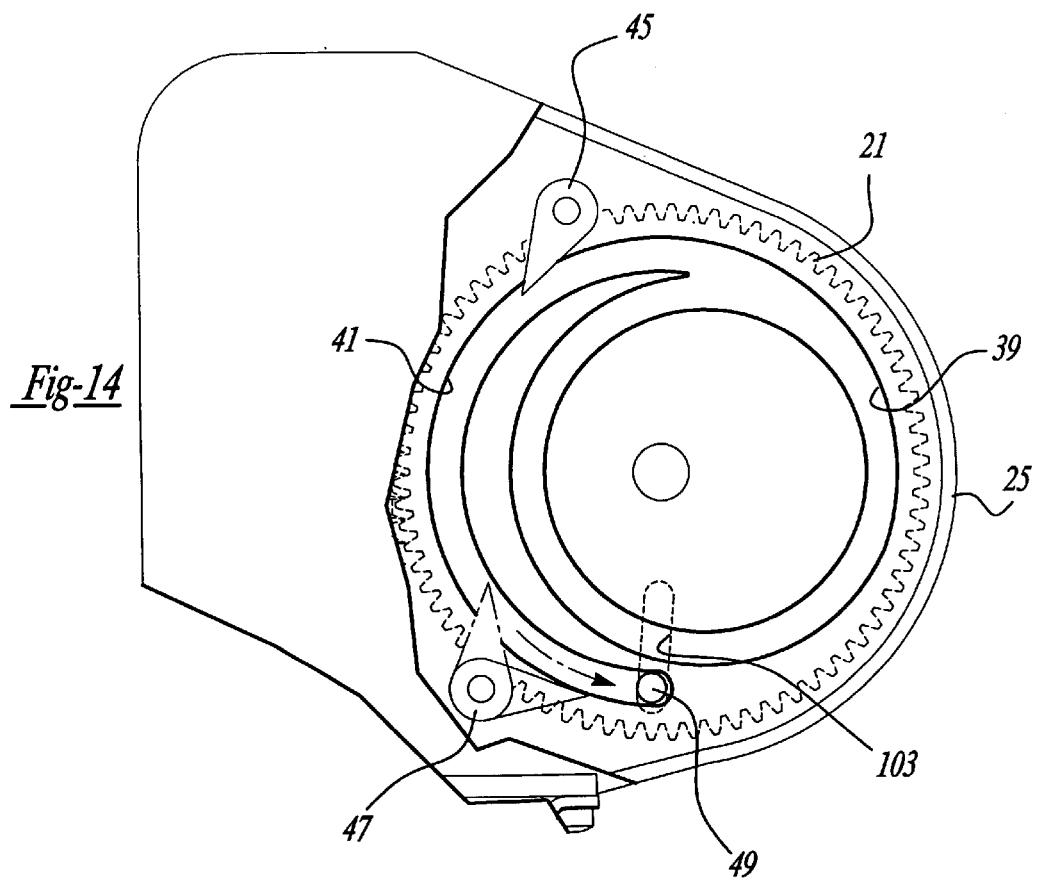

When lock actuation is completed, the pin continues in the same rotational direction according to FIG. 12 until it engages and presses against a second lever 109, preferably glass release lever 47, in a manner similar to that of the first lever 109. Thus, referring to FIG. 14, arm 121 is rotated by pin 49 from a position of rear window lock actuation to rear window release or unlock. The rear glass window is biased outwards only, and the lever does not operate in the reverse direction to lock the rear window of the vehicle. FIGS. 11 and 13 illustrate the corresponding top views of worm gear 21 and the parked position of pin 91 at the moment of rotation shown in FIGS. 12 and 14, respectively. Upon receipt of the appropriate electrical command from the microprocessor to selectively energize the electric motor, pin 49 is then guided back to inner track 39 in order for the window wiping mode to operate again.

While various aspects of the window wiper system have been disclosed, it should be appreciated that other variations may be employed without departing from the spirit of the present invention. For example, a raised rather than the disclosed depressed track may be mounted on the worm gear. Furthermore, another rotatable member beyond a worm gear can be employed with a track. Additionally, the function and stop of the preferred embodiment can be employed with a constantly reversing electric motor and without a four-bar-type linkage. Additionally, a variety of other gear reduction and linkage oscillating mechanisms are usable with the track and stop portions of the present invention. It is further envisioned that the passive stop may have alternate shapes and can be externally mounted on the gear or a motor casing. The coupling and intermittent motion mechanisms can also encompass many other shapes and formations depending on the desired track configuration. Various materials have been disclosed in an exemplary fashion, however, other materials may of course be employed. It is intended by the following claims to cover these and any other departures from the disclosed embodiments which fall within the true spirit of this invention.

The invention claimed is:

1. A multi-functional apparatus for use in an automotive vehicle, said apparatus comprising:

a housing having an inner surface, intersecting inner and outer tracks being located on said inner surface;

a rotatable member located in said housing, an elongated track being located on said rotatable member;

an electromagnetic device operably driving said rotatable member;

a first coupling operably riding along said track of said rotatable member; and a second coupling selectively riding along said tracks of said housing in response to movement of said rotatable member.

2. The apparatus of claim 1 further comprising at least one intermittent motion mechanism pivotably connected to said inner surface of said housing.

3. The apparatus of claim 2 wherein said second coupling rides along said inner track when said first coupling rides along said track of said rotatable member, and further wherein said second coupling rides along said outer track of said housing when said first coupling is stopped, said second coupling contacting said at least one intermittent motion mechanism while riding along said outer track.

4. The apparatus of claim 2 further comprising a second intermittent motion mechanism pivotably connected to said inner surface of said housing.

5. The apparatus of claim 4 wherein a liftgate is locked by said first intermittent motion mechanism and a rear liftgate window is released by said second intermittent motion mechanism when said-second coupling actuates said mechanisms while riding along said outer track in one direction, and further wherein said liftgate is unlocked by said first intermittent motion mechanism when said second coupling actuates said mechanism while riding along said outer track in a second direction.

6. The apparatus of claim 1 further comprising a window wiper oscillating mechanism attached with said first coupling and a wiper assembly coupled with said window wiper oscillating mechanism.

7. The apparatus of claim 6 wherein said window wiper oscillating mechanism and said wiper assembly are retained in a park position when said rotatable member is rotated in a second direction, a first rotational direction of said rotatable member oscillating said wiper assembly repeatedly back and forth in its normal wiper path.

8. The apparatus of claim 6 wherein said window wiper oscillating mechanism is a four-bar linkage arrangement.

9. The apparatus of claim 1 wherein said elongated track is substantially Q-shaped and includes a substantially circular portion and a short, inwardly projecting path disposed along said circular portion.

10. The apparatus of claim 1 wherein said first coupling is a pin which rides in said elongated track located on said rotatable member, said track is depressed below a nominal face of said rotatable member, said rotatable member is a worm gear, and further wherein said second coupling is an actuator pin which selectively rides in either of said inner and outer tracks, said inner and outer tracks are depressed below a nominal face of said inner surface of said housing.

11. The apparatus of claim 1 further comprising a flexible gate located at said intersection of said inner and outer tracks of said housing to guide said second coupling from said inner track to said outer track.

12. The apparatus of claim 1 further comprising a substantially V-shaped ramp located at an intersection of said inner and outer tracks of said housing to guide said second coupling from said inner track to said outer track.

13. The apparatus of claim 1 further comprising a path perpendicular to said tracks of said housing and being located on said rotatable member, wherein said second coupling rides along said inner and outer tracks while trapped in said path.

14. The apparatus of claim 1 wherein said intersecting inner and outer tracks have a spiral curved shape.

15. A multi-functional apparatus for use in an automotive vehicle, said apparatus comprising:

an electric motor;

a surface having at least one intermittent motion track;

a main gear located adjacent to said surface and rotating in a first direction in response to energization of said electric motor;

a first track disposed on said main gear, said first track having a wiping portion and a park portion;

a window wiper shaft;

a first coupling riding along said first track for controlling movement of said window wiper shaft;

an intermittent motion mechanism overlapping said intermittent motion track; and a second coupling riding along said intermittent motion track for selectively actuating said intermittent motion mechanism when said first coupling is located along said park portion of said first track.

16. The apparatus of claim 15 wherein said first track is substantially Q-shaped and includes a substantially circular portion and a short, inwardly projecting path disposed along said circular portion.

17. The apparatus of claim 15 wherein said first coupling is a pin which rides in said first track located on said main gear, said track is depressed below a nominal face of said gear, said main gear is a worm gear, and further wherein said second coupling is an actuator pin which selectively rides in said at least one intermittent motion track, said track including intersecting inner and outer tracks depressed below a nominal face of said surface.

18. The apparatus of claim 17 wherein said intersecting inner and outer tracks have a spiral curved shape.

19. The apparatus of claim 15 further including a second intermittent motion mechanism overlapping said intermittent motion track.

20. The apparatus of claim 19 wherein said first intermittent motion mechanism is a lever for a liftgate lock and said second intermittent motion mechanism is a lever for a rear window release, wherein a liftgate is locked and a rear liftgate window is released when said second coupling actuates said levers while riding along said at least one intermittent motion track in one direction, and further wherein said liftgate is unlocked when said second coupling actuates said mechanism while riding along said track in a second direction.

21. The apparatus of claim 15 further comprising:

a window wiper assembly coupled to said window wiper shaft, said window wiper assembly having a normal back and forth wiping range in said wiping portion of said first track and having a park position located outside of said normal window wiping range in said park portion of said first track;

wherein said electric motor and said main gear respectively rotate in first directions to oscillate said window wiper shaft and said window wiper assembly back and forth along said normal window wiping range, said electric motor and said main gear respectively rotate in second opposite directions from said first directions to move said window wiper shaft and said window wiper assembly to said park position;

and further wherein said window wiper assembly is maintained in said park position even when said main gear is rotated a predetermined amount.

\* \* \* \* \*